United States Patent
Hafri (10) Patent No.: US 9,838,340 B2
(45) Date of Patent: *Dec. 5, 2017

(54) SYSTEMS AND METHODS FOR STORING MESSAGE DATA

(71) Applicant: Machine Zone, Inc., Palo Alto, CA (US)

(72) Inventor: Younes Hafri, Lausanne (CH)

(73) Assignee: Machine Zone, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/290,695

(22) Filed: Oct. 11, 2016

(65) Prior Publication Data

US 2017/0104696 A1 Apr. 13, 2017

Related U.S. Application Data

(63) Continuation of application No. PCT/US2016/037358, filed on Jun. 14, 2016, which is a continuation of application No. 14/879,661, filed on Oct. 9, 2015, now Pat. No. 9,385,976.

(51) Int. Cl.
| | |
|---|---|
| *G06F 15/16* | (2006.01) |
| *H04L 12/861* | (2013.01) |
| *H04L 12/925* | (2013.01) |
| *H04L 12/911* | (2013.01) |

(52) U.S. Cl.
CPC ........ *H04L 49/9042* (2013.01); *H04L 47/722* (2013.01); *H04L 47/826* (2013.01)

(58) Field of Classification Search
USPC ........................................................ 709/226
See application file for complete search history.

(56) References Cited

U.S. PATENT DOCUMENTS

| | | | |
|---|---|---|---|
| 4,264,924 | A | 4/1981 | Freeman |
| 5,706,331 | A | 1/1998 | Wang et al. |
| 5,878,228 | A | 3/1999 | Miller et al. |
| 6,208,691 | B1 | 3/2001 | Balakrishnan et al. |
| 6,549,959 | B1 | 4/2003 | Yates et al. |

(Continued)

OTHER PUBLICATIONS

Int'l Search Report and Written Opinion of the ISA/EP in PCT/US2014/041531; dated Oct. 6, 2016; 12 pgs.

(Continued)

*Primary Examiner* — Hee Soo Kim
(74) *Attorney, Agent, or Firm* — Womble Carlyle Sandridge & Rice, LLP (57) ABSTRACT

Methods, systems, and apparatus, including computer programs encoded on a computer storage medium, are described for storing message data in a PubSub system. In certain examples, messages are received from a plurality of publishers for a plurality of distinct channels. The messages are ordered and stored in a plurality of buffers, with each channel having its own respective buffer. After a message has been written to a writable portion of the buffer for a channel, a pointer demarking a boundary between a readable portion of the buffer and the writeable portion of the buffer is advanced in an atomic operation. Following the atomic operation, the message resides in the readable portion and may be accessed by PubSub system components and/or processes. In general, one or more subscribers, components, or processes may read messages from the readable portion, in parallel.

20 Claims, 6 Drawing Sheets

(56) References Cited

U.S. PATENT DOCUMENTS

| | | |
|---|---|---|
| 7,047,394 B1 | 5/2006 | Van Dyke et al. |
| 7,065,633 B1 | 6/2006 | Yates, Jr. et al. |
| 7,376,092 B2 | 5/2008 | Yajnik et al. |
| 7,613,813 B2 | 11/2009 | Hussain et al. |
| 7,668,908 B2 | 2/2010 | Kakivaya et al. |
| 7,676,580 B2 | 3/2010 | Hill et al. |
| 7,774,720 B1 | 8/2010 | Demetriades et al. |
| 7,917,124 B2 | 3/2011 | D'Angelo et al. |
| 7,929,562 B2 | 4/2011 | Petrovykh |
| 7,941,448 B2 | 5/2011 | Eslambolchi et al. |
| 7,970,828 B2 | 6/2011 | Carmeli et al. |
| 7,970,918 B2 | 6/2011 | Thompson et al. |
| 8,051,140 B2 | 11/2011 | Lum et al. |
| 8,065,384 B2 | 11/2011 | Plewnia et al. |
| 8,065,504 B2 | 11/2011 | Yates, Jr. et al. |
| 8,074,055 B1 | 12/2011 | Yates, Jr. et al. |
| 8,086,672 B2 | 12/2011 | Horvitz |
| 8,121,828 B2 | 2/2012 | Yates, Jr. et al. |
| 8,375,095 B2 | 2/2013 | Yurkovich et al. |
| 8,392,555 B2 | 3/2013 | Gale et al. |
| 8,429,702 B2 | 4/2013 | Yasrebi et al. |
| 8,441,965 B2 | 5/2013 | Jazra |
| 8,489,674 B2 | 7/2013 | Srivastava et al. |
| 8,539,359 B2 | 9/2013 | Rapaport et al. |
| 8,605,781 B2 | 12/2013 | Rabenold et al. |
| 8,799,213 B2 | 8/2014 | Wong et al. |
| 8,850,015 B2 | 9/2014 | Finn |
| 8,850,490 B1 | 9/2014 | Thomas et al. |
| 8,856,202 B2 | 10/2014 | McCabe et al. |
| 8,886,731 B2 | 11/2014 | Gunawardena et al. |
| 8,898,293 B2 | 11/2014 | Raleigh et al. |
| 8,965,409 B2 | 2/2015 | Abhyanker |
| 9,043,822 B1 | 5/2015 | Calzone et al. |
| 9,215,261 B2 | 12/2015 | Marcus |
| 9,270,944 B2 | 2/2016 | Brooks et al. |
| 9,319,363 B1 | 4/2016 | Walkin et al. |
| 9,319,365 B1 | 4/2016 | Milyakov |
| 9,385,976 B1 | 7/2016 | Hafri |
| 9,397,973 B1 | 7/2016 | Kushnir et al. |
| 9,407,585 B1 | 8/2016 | Walkin et al. |
| 9,407,593 B1 | 8/2016 | Milyakov |
| 2002/0016851 A1 | 2/2002 | Border |
| 2004/0073641 A1 | 4/2004 | Minhazuddin et al. |
| 2004/0083264 A1 | 4/2004 | Veselov |
| 2004/0139166 A1 | 7/2004 | Collison |
| 2004/0139309 A1 | 7/2004 | Gentil et al. |
| 2004/0167932 A1 | 8/2004 | Edmonds |
| 2005/0021622 A1 | 1/2005 | Cullen |
| 2005/0047396 A1 | 3/2005 | Helm et al. |
| 2005/0171799 A1 | 8/2005 | Hull et al. |
| 2005/0262205 A1 | 11/2005 | Nikolov et al. |
| 2005/0262215 A1 | 11/2005 | Kirov et al. |
| 2006/0036679 A1 | 2/2006 | Goodman et al. |
| 2006/0106840 A1 | 5/2006 | Rooney |
| 2006/0149787 A1 | 7/2006 | Surlaker et al. |
| 2007/0013948 A1 | 1/2007 | Bevan |
| 2007/0028173 A1 | 2/2007 | Lauder |
| 2008/0016198 A1 | 1/2008 | Johnston-Watt et al. |
| 2008/0186973 A1 | 8/2008 | Shihara et al. |
| 2008/0235366 A1 | 9/2008 | Telfer |
| 2009/0037514 A1 | 2/2009 | Lankford et al. |
| 2009/0157795 A1 | 6/2009 | Black |
| 2009/0222348 A1 | 9/2009 | Ransom et al. |
| 2009/0287761 A1 | 11/2009 | Hawkins et al. |
| 2010/0251262 A1 | 9/2010 | Rokicki et al. |
| 2011/0060812 A1 | 3/2011 | Middleton |
| 2011/0176554 A1 | 7/2011 | Yamada et al. |
| 2011/0179162 A1 | 7/2011 | Mayo |
| 2011/0231523 A1 | 9/2011 | Haugland et al. |
| 2012/0023116 A1 | 1/2012 | Wilkes et al. |
| 2012/0150960 A1 | 6/2012 | Nalawade |
| 2012/0197990 A1 | 8/2012 | Li et al. |
| 2012/0278728 A1 | 11/2012 | Malin et al. |
| 2012/0284756 A1 | 11/2012 | Kotecha et al. |
| 2013/0031162 A1 | 1/2013 | Willis et al. |
| 2013/0066967 A1 | 3/2013 | Alexander |
| 2013/0067114 A1 | 3/2013 | Hjelm et al. |
| 2013/0081060 A1 | 3/2013 | Otenko |
| 2013/0132553 A1 | 5/2013 | Stratton et al. |
| 2013/0159472 A1 | 6/2013 | Newton et al. |
| 2013/0212491 A1 | 8/2013 | Yerli |
| 2013/0254314 A1 | 9/2013 | Chow |
| 2013/0290449 A1 | 10/2013 | Norby et al. |
| 2013/0340097 A1 | 12/2013 | Gowel |
| 2014/0082085 A1 | 3/2014 | Krishnaprasad et al. |
| 2014/0114738 A1 | 4/2014 | Tseng et al. |
| 2014/0189772 A1 | 7/2014 | Yamagishi et al. |
| 2014/0226713 A1 | 8/2014 | Perlman et al. |
| 2014/0237057 A1 | 8/2014 | Khodorenko |
| 2014/0286354 A1 | 9/2014 | Van De Poel et al. |
| 2014/0310369 A1 | 10/2014 | Makhervaks et al. |
| 2014/0372489 A1 | 12/2014 | Jaiswal et al. |
| 2014/0372755 A1 | 12/2014 | Ristock et al. |
| 2015/0012598 A1 | 1/2015 | Klimt |
| 2015/0100664 A1 | 4/2015 | Flack et al. |
| 2015/0207851 A1 | 7/2015 | Nampally |
| 2015/0262151 A1 | 9/2015 | Enzminger et al. |
| 2015/0317676 A1 | 11/2015 | Reid et al. |
| 2015/0365358 A1 | 12/2015 | Strassner |
| 2015/0379160 A1 | 12/2015 | Avraham et al. |
| 2016/0072865 A1 | 3/2016 | Kaplinger et al. |
| 2016/0219089 A1 | 7/2016 | Murthy et al. |
| 2016/0261480 A1 | 9/2016 | Agarwal et al. |
| 2016/0285986 A1 | 9/2016 | Mokhtari et al. |

OTHER PUBLICATIONS

Int'l Search Report and Written Opinion of the ISA/EP in PCT/US2016/037358; dated Oct. 10, 2016; 13pgs.
Int'l Search Report and Written Opinion of the ISA/EP in PCT/US2016/041530; dated Oct. 6, 2016; 12pgs.
Jafarpour et al., "Dynamic Load Balancing for Cluster-based Publish/Subscribe System," IEEE 2009; http://ieeexp lore.ieee.org/document/5230660/.
Preshing, "Atomic vs. Non-Atomic Operations," accessed on the internet at http://preshing.com/20130618/atomic-vs-non-atomic-operations; downloaded Sep. 20, 2016; 10pgs.
Bustamante, F., "The Active Streams Approach to Adaptive Distributed Applications and Services," Thesis, Georgia Institute of Technology; 112pgs.; Nov. 2001.
Cagle, K., "Convert a Text File to XML," accessed on the internet at http://www.devx.com/getHelpOn/10MinuteSolution/20356; downloaded Sep. 22, 2016; 8pgs.
Chakravarthy, S. and Vontella, N., "A Publish / Subscribe Based Architecture of an Alert Server to Support Prioritized and Persistent Alerts," Lecture Notes in Computer Science; 3347:1-6-116; Jan. 2004.
Cilia, M., et al., "Looking into the Past: Enhancing Mobile Publish/Subscribe Middleware," Proceedings of the 2nd Int'l Workshop on Distributed Event-based Systems (DEBS '03); pp. 1-8; Jun. 2003.
Corsaro, A., et al., "Quality of Service in Publish/Subscribe Middleware," IOS Press; pp. 1-19; 2003.
Int'l Search Report and Written Opinion of the ISA/EP in PCT/US2016/022316; dated Jun. 1 , 2016; 11pgs.
Int'l Search Report and Written Opinion of the ISA/EP in PCT/US2016/023164; dated Jul. 11, 2016; 15pgs.
Int'l Search Report and Written Opinion of the ISA/EP in PCT/US2016/039958; dated Oct. 4, 2016; 11pgs.
King, A., et al., "Load Balancing Content-Based Publish/Subscribe Systems," ACM Transactions on Computer Systems; 28(4):9:1-9:55; Dec. 2010.
Phanishayee, A., "Chaining for Flexible and High-Performance Key-Value Systems," Doctoral Dissertation, Carnegie Mellon University, School of Computer Science; 148pgs.; Sep. 2012.
Vahdat, A. and Becker, D., "Epidemic Routing for Partially-Connected Ad Hoc Networks," Duke University; 14pgs.; Jul. 2000.
Zeidler, et al., "Mobility Support with REBECA," Proc. 23rd Int'l Conference on Distributed Computing Systems Workshops; May 19-22; 2003; 7pgs.

(56) References Cited

OTHER PUBLICATIONS

"Cloud Pub/Sub," accessed on the internet at: https://cloud.google.com/pubsub/overview; downloaded Aug. 7, 2015; 5pgs.

"Publish—subscribe pattern"; accessed on the internet at: https://en.wikipedia.org/wiki/Publish%E2%80%93subscribe_pattern; downloaded Aug. 7, 2015; 4pgs.

"Welcome to PyPubSub's Home Page!," accessed on the internet at: http://pubsub.sourceforge.net/; downloaded Aug. 7, 2015; 2pgs.

U.S. Appl. No. 15/223,392, filed Jul. 29, 2016, Scalable, Real-Time Messaging System, Walkin, et al.

U.S. Appl. No. 14/821,421, filed Aug. 7, 2015, Scalable, Real-Time Messaging System, Walkin, et al.

U.S. Appl. No. 15/067,476, filed Mar. 11, 2016, Scalable, Real-Time Messaging System, Walkin, et al.

U.S. Appl. No. 15/175,588, filed Jun. 7, 2016, Message Compression in Scalable Messaging System, Walkin.

U.S. Appl. No. 15/231,044, filed Aug. 8, 2016, Access Control for Message Channels in a Messaging System, Walkin, et al.

U.S. Appl. No. 15/244,380, filed Aug. 23, 2016, Scalable, Real-Time Messaging System, Walkin, et al.

U.S. Appl. No. 15/274,281, filed Sep. 23, 2016, Systems and Methods for Providing Messages to Multiple Subscribers, Milyakov.

U.S. Appl. No. 15/202,908, filed Jul. 6, 2016, Multiple-Speed Message Channel of Messaging System, Walkin.

U.S. Appl. No. 15/063,390, filed Mar. 7, 2016, Systems and Methods for Storing and Transferring Message Data, Milyakov.

U.S. Appl. No. 15/252,989, filed Aug. 31, 2016, Data Replication in Scalable Messaging System, Hafri, et al.

U.S. Appl. No. 15/291,633, filed Oct. 12, 2016, Systems and Methods for Storing and Transferring Message Data, Milyakov.

U.S. Appl. No. 15/196,597, filed Jun. 29, 2016, Systems and Methods for Transferring Message Data, Kushnir, et al.

U.S. Appl. No. 15/155,384, filed May 16, 2016, Maintaining Persistence of a Messaging System, Kushnir, et al.

SYSTEMS AND METHODS FOR STORING MESSAGE DATA

CROSS REFERENCE TO RELATED APPLICATIONS

This application is a continuation of International Application No. PCT/US16/37358, filed Jun. 14, 2016, which is a continuation of U.S. application Ser. No. 14/879,661, filed Oct. 9, 2015 (now U.S. Pat. No. 9,385,976, issued Jul. 5, 2016), the entire contents of each of which are hereby incorporated by reference.

BACKGROUND

This specification relates to a data communication system and, in particular, a system that implements real-time, scalable publish-subscribe messaging.

The publish-subscribe pattern (or "PubSub") is a data communication messaging arrangement implemented by software systems where so-called publishers publish messages to topics and so-called subscribers receive the messages pertaining to particular topics to which they are subscribed. There can be one or more publishers per topic and publishers generally have no knowledge of what subscribers, if any, will receive the published messages. Some PubSub systems do not cache messages or have small caches meaning that subscribers may not receive messages that were published before the time of subscription to a particular topic. PubSub systems can be susceptible to performance instability during surges of message publications or as the number of subscribers to a particular topic increases.

SUMMARY

The systems and methods described herein allow messages to be received and stored by a PubSub system accurately and efficiently. In certain examples, the PubSub system includes a plurality of channels that each corresponds to a separate stream of message data. Each channel has a respective buffer that stores messages for the channel. Messages are written to a writable portion of the buffer and are read from a readable portion of the buffer. A pointer indicates or demarks a boundary between the readable and writable portions of the buffer. After a message has been successfully written to the writable portion, the pointer is advanced in an atomic operation, after which the message resides in the readable portion.

Advantageously, PubSub system components are able to read from and write to each buffer in parallel. This allows components and processes associated with the PubSub system to access each buffer simultaneously, for reading and/or writing purposes. Additionally, use of an atomic operation ensures message data in the readable portion of the buffer is accurate. The atomic operation, in general, prevents PubSub system components from reading a new message until the pointer has been advanced and the new message has been moved to the readable portion.

Embodiments of the systems and methods described herein provide a "zero copy queue" distributed storage system that allows multiple processes (e.g., ERLANG Queue processes) to share the same memory space. In some examples, the zero copy queue enables (i) ultra-fast memory writes and memory reads, (ii) ultra-low latency (e.g., less than 100 nanoseconds) for parallel writes, and/or (iii) ultra-low latency (e.g., less than 10 nanoseconds) for up to 50,000 parallel reads. The zero copy queue also introduces an automatic back-pressure mechanism to achieve maximum read/write throughput.

Existing approaches to solve the problems described herein typically employ a hash table or a key-value store, such as a built-in ERLANG term storage (ETS). ETS is an in-memory database that is part of ERLANG virtual machine and sits in a section of the virtual machine where destructive updates are allowed. Although such updates are fast, and provide an easy way for programmers to optimize certain critical code, ETS tables have an intrinsic locking mechanism that adds a limitation on the speed of concurrent reads and writes.

By comparison, examples of the zero copy queue approach described herein do not have such intrinsic limitations because locks are not used. This essentially means readers never block a writer, and writers never block a reader. Hence, both readers and writers function at full speed, free of any interruption.

In certain implementations, the zero copy queue falls in the category of non-blocking algorithms or, more precisely, "wait-free" algorithms. Wait-freedom provides fast system-wide throughput with no starvation of processes.

In general, one aspect of the subject matter described in this specification can be embodied in methods that include the actions of performing, by one or more computers: receiving from a plurality of publishers a plurality of messages, each of the messages being associated with one of a plurality of distinct channels; ordering the messages associated with each channel; storing each message of each of the channels in a respective buffer for the channel according to the order of the messages assigned to the channel, wherein storing includes storing the message in a writable portion of the buffer and advancing a pointer demarking a boundary between a readable portion of the buffer and the writeable portion of the buffer in an atomic operation such that the message is in the readable portion of the buffer after the atomic operation has completed; and allowing one or more subscribers to read from the readable portion of one or more of the buffers during the storing.

In certain implementations, the atomic operation cannot be interrupted by another process or thread of execution. Storing the message in the writable portion of the buffer may include storing a length of the message at a first location in the writable portion of the buffer and storing the message in the writable portion of the buffer following the first location. Advancing the pointer demarking the boundary between the readable portion of the buffer and the writable portion of the buffer in an atomic operation may include storing a sum of the length of the message and a current value of the pointer in the pointer.

In some examples, each buffer only stores messages for a single channel. Each buffer for a particular channel may expires at a different time based on the time-to-live for the buffer. A particular buffer may correspond to a writing process on one of the computers. In various implementations, each buffer has a respective time-to-live upon expiration of which will cause the buffer to be inaccessible to publishers and subscribers. Ordering the messages associated with each channel may include ordering the messages according to respective receipt times of the messages.

In another aspect, the subject matter described in this specification can be embodied in a system that includes a non-transitory computer readable medium having instructions stored thereon. The system also includes a data processing apparatus configured to execute the instructions to perform operations including: receiving from a plurality of publishers a plurality of messages, each of the messages being associated with one of a plurality of distinct channels; ordering the messages associated with each channel; storing each message of each of the channels in a respective buffer for the channel according to the order of the messages assigned to the channel, wherein storing includes storing the message in a writable portion of the buffer and advancing a pointer demarking a boundary between a readable portion of the buffer and the writeable portion of the buffer in an atomic operation such that the message is in the readable portion of the buffer after the atomic operation has completed; and allowing one or more subscribers to read from the readable portion of one or more of the buffers during the storing.

In certain implementations, the atomic operation cannot be interrupted by another process or thread of execution. Storing the message in the writable portion of the buffer may include storing a length of the message at a first location in the writable portion of the buffer and storing the message in the writable portion of the buffer following the first location. Advancing the pointer demarking the boundary between the readable portion of the buffer and the writable portion of the buffer in an atomic operation may include storing a sum of the length of the message and a current value of the pointer in the pointer.

In some examples, each buffer only stores messages for a single channel. Each buffer for a particular channel may expires at a different time based on the time-to-live for the buffer. A particular buffer may correspond to a writing process on one of the computers. In various implementations, each buffer has a respective time-to-live upon expiration of which will cause the buffer to be inaccessible to publishers and subscribers. Ordering the messages associated with each channel may include ordering the messages according to respective receipt times of the messages.

In another aspect, the subject matter described in this specification can be embodied in a computer program product stored in one or more non-transitory storage media for controlling a processing mode of a data processing apparatus. The computer program product is executable by the data processing apparatus to cause the data processing apparatus to perform operations including: receiving from a plurality of publishers a plurality of messages, each of the messages being associated with one of a plurality of distinct channels; ordering the messages associated with each channel; storing each message of each of the channels in a respective buffer for the channel according to the order of the messages assigned to the channel, wherein storing includes storing the message in a writable portion of the buffer and advancing a pointer demarking a boundary between a readable portion of the buffer and the writeable portion of the buffer in an atomic operation such that the message is in the readable portion of the buffer after the atomic operation has completed; and allowing one or more subscribers to read from the readable portion of one or more of the buffers during the storing.

In certain implementations, the atomic operation cannot be interrupted by another process or thread of execution. Storing the message in the writable portion of the buffer may include storing a length of the message at a first location in the writable portion of the buffer and storing the message in the writable portion of the buffer following the first location. Advancing the pointer demarking the boundary between the readable portion of the buffer and the writable portion of the buffer in an atomic operation may include storing a sum of the length of the message and a current value of the pointer in the pointer.

In some examples, each buffer only stores messages for a single channel. Each buffer for a particular channel may expires at a different time based on the time-to-live for the buffer. A particular buffer may correspond to a writing process on one of the computers. In various implementations, each buffer has a respective time-to-live upon expiration of which will cause the buffer to be inaccessible to publishers and subscribers. Ordering the messages associated with each channel may include ordering the messages according to respective receipt times of the messages.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Figure 1A:
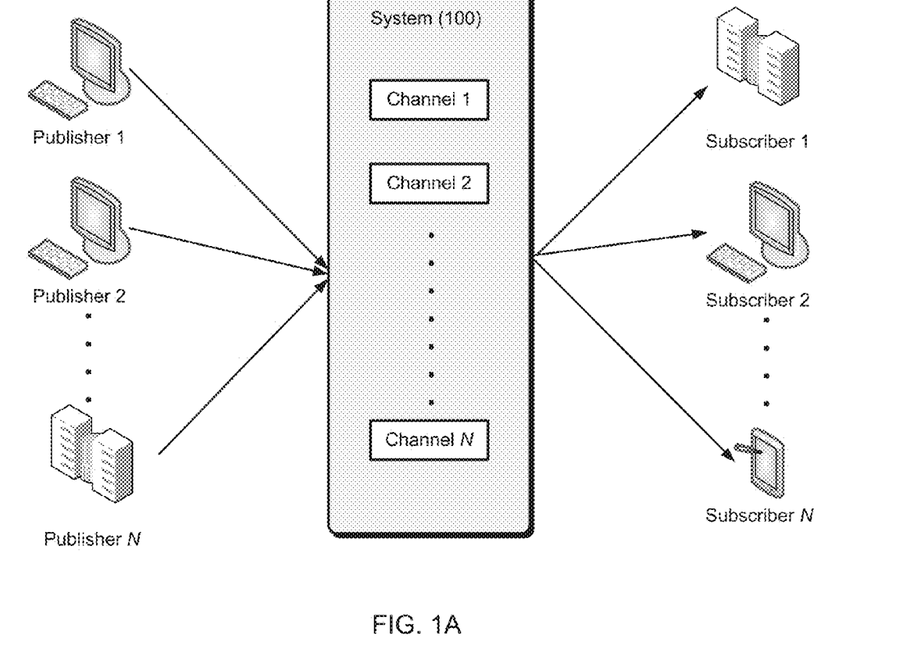
FIG. 1A illustrates an example system that supports the PubSub communication pattern.

FIG. 1A illustrates an example system 100 that supports the PubSub communication pattern. Publisher clients (e.g., Publisher 1) can publish messages to named channels (e.g., "Channel 1") by way of the system 100. A message can comprise any type of information including one or more of the following: text, image content, sound content, multimedia content, video content, binary data, and so on. Other types of message data are possible. Subscriber clients (e.g., Subscriber 2) can subscribe to a named channel using the system 100 and start receiving messages which occur after the subscription request or from a given position (e.g., a message number or time offset). A client can be both a publisher and a subscriber.

Depending on the configuration, a PubSub system can be categorized as follows:

One to One (1:1). In this configuration there is one publisher and one subscriber per channel. A typical use case is private messaging.

One to Many (1:N). In this configuration there is one publisher and multiple subscribers per channel. Typical use cases are broadcasting messages (e.g., stock prices).

Many to Many (M:N). In this configuration there are many publishers publishing to a single channel. The messages are then delivered to multiple subscribers. Typical use cases are map applications.

There is no separate operation needed to create a named channel. A channel is created implicitly when the channel is subscribed to or when a message is published to the channel. In some implementations, channel names can be qualified by a name space. A name space comprises one or more channel names. Different name spaces can have the same channel names without causing ambiguity. The name space name can be a prefix of a channel name where the name space and channel name are separated by a dot. In some implementations, name spaces can be used when specifying channel authorization settings. For instance, the messaging system 100 may have app1.foo and app1.system.notifications channels where "app1" is the name of the name space. The system can allow clients to subscribe and publish to the app1.foo channel. However, clients can only subscribe to, but not publish to the app1.system.notifications channel.

Figure 1B:
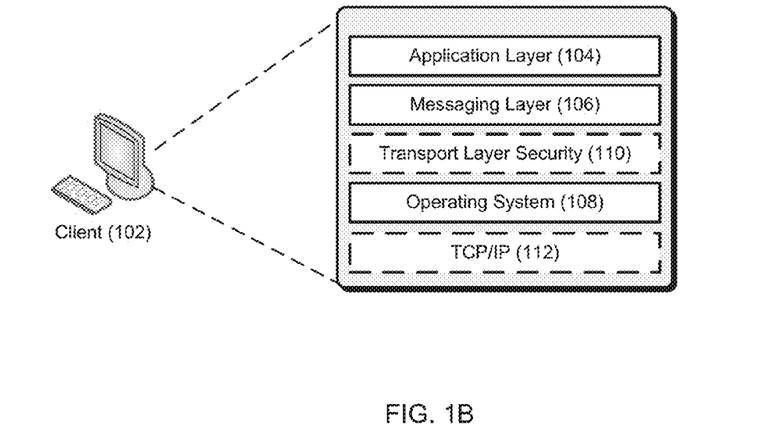
FIG. 1B illustrates functional layers of software on an example client device.

FIG. 1B illustrates functional layers of software on an example client device. A client device (e.g., client 102) is a data processing apparatus such as, for example, a personal computer, a laptop computer, a tablet computer, a smart phone, a smart watch, or a server computer. Other types of client devices are possible. The application layer 104 comprises the end-user application(s) that will integrate with the PubSub system 100. The messaging layer 106 is a programmatic interface for the application layer 104 to utilize services of the system 100 such as channel subscription, message publication, message retrieval, user authentication, and user authorization. In some implementations, the messages passed to and from the messaging layer 106 are encoded as JavaScript Object Notation (JSON) objects. Other message encoding schemes are possible.

The operating system 108 layer comprises the operating system software on the client 102. In various implementations, messages can be sent and received to/from the system 100 using persistent or non-persistent connections. Persistent connections can be created using, for example, network sockets. A transport protocol such as TCP/IP layer 112 implements the Transport Control Protocol Internet Protocol communication with the system 100 that can be used by the messaging layer 106 to send messages over connections to the system 100. Other communication protocols are possible including, for example, User Datagram Protocol (UDP). In further implementations, an optional Transport Layer Security (TLS) layer 110 can be employed to ensure the confidentiality of the messages.

Figure 2:
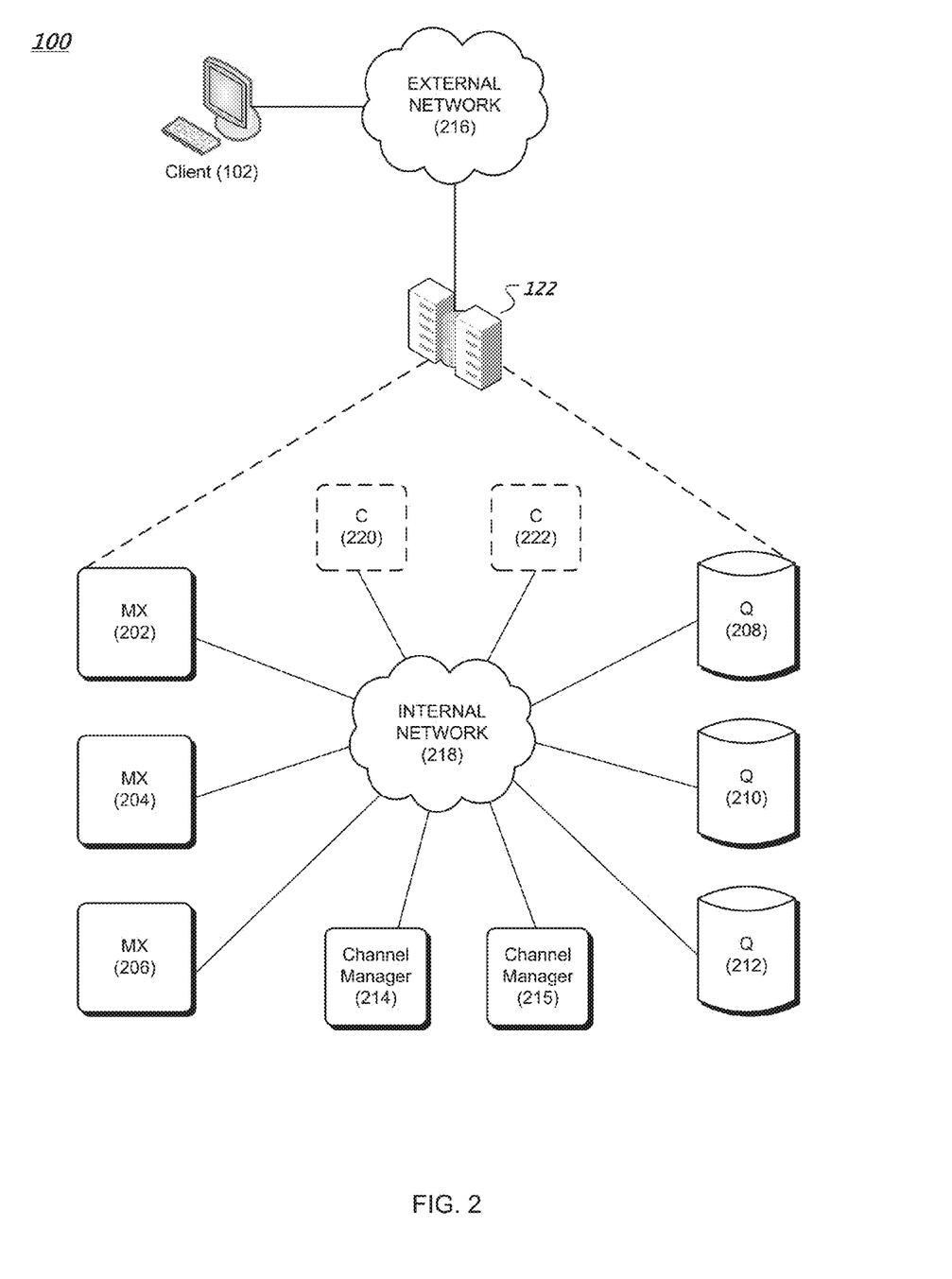
FIG. 2 is a diagram of an example messaging system.

FIG. 2 is a diagram of an example messaging system 100. The system 100 provides functionality for implementing PubSub communication patterns. The system comprises software components and storage that can be deployed at one or more data centers 122 in one or more geographic locations, for example. The system comprises MX nodes (e.g., MX nodes or multiplexer nodes 202, 204 and 206), Q nodes (e.g., Q nodes or queue nodes 208, 210 and 212), one or more channel manager nodes (e.g., channel managers 214, 215), and optionally one or more C nodes (e.g., C nodes or cache nodes 220 and 222). Each node can execute in a virtual machine or on a physical machine (e.g., a data processing apparatus). Each MX node serves as a termination point for one or more publisher and/or subscriber connections through the external network 216. The internal communication among MX nodes, Q nodes, C nodes, and the channel manager, is conducted over an internal network 218, for example. By way of illustration, MX node 204 can be the terminus of a subscriber connection from client 102. Each Q node buffers channel data for consumption by the MX nodes. An ordered sequence of messages published to a channel is a logical channel stream. For example, if three clients publish messages to a given channel, the combined messages published by the clients comprise a channel stream. Messages can be ordered in a channel stream by time of publication by the client, by time of receipt by an MX node, or by time of receipt by a Q node. Other ways for ordering messages in a channel stream are possible. In the case where more than one message would be assigned to the same position in the order, one of the messages can be chosen (e.g., randomly) to have a later sequence in the order. Each channel manager node is responsible for managing Q node load by splitting channel streams into so-called streamlets. Streamlets are discussed further below. The optional C nodes provide caching and load removal from the Q nodes.

In the example messaging system 100, one or more client devices (publishers and/or subscribers) establish respective persistent connections (e.g., TCP connections) to an MX node (e.g., MX node 204). The MX node serves as a termination point for these connections. For instance, external messages (e.g., between respective client devices and the MX node) carried by these connections can be encoded based on an external protocol (e.g., JSON). The MX node terminates the external protocol and translates the external messages to internal communication, and vice versa. The MX nodes publish and subscribe to streamlets on behalf of clients. In this way, an MX node can multiplex and merge requests of client devices subscribing for or publishing to the same channel, thus representing multiple client devices as one, instead of one by one.

In the example messaging system 100, a Q node (e.g., Q node 208) can store one or more streamlets of one or more channel streams. A streamlet is a data buffer for a portion of a channel stream. A streamlet will close to writing when its storage is full. A streamlet will close to reading and writing and be de-allocated when its time-to-live (TTL) has expired. By way of illustration, a streamlet can have a maximum size of 1 MB and a TTL of three minutes. Different channels can have streamlets limited by different TTLs. For instance, streamlets in one channel can exist for up to three minutes, while streamlets in another channel can exist for up to 10 minutes. In various implementations, a streamlet corresponds to a computing process running on a Q node. The computing process can be terminated after the streamlet's TTL has expired, thus freeing up computing resources (for the streamlet) back to the Q node, for example.

When receiving a publish request from a client device, an MX node (e.g., MX node 204) makes a request to a channel manager (e.g., channel manager 214) to grant access to a streamlet to write the message being published. Note, however, that if the MX node has already been granted write access to a streamlet for the channel (and the channel has not been closed to writing), the MX node can write the message to that streamlet without having to request a grant to access the streamlet. Once a message is written to a streamlet for a channel, the message can be read by MX nodes and provided to subscribers of that channel.

Similarly, when receiving a channel subscription request from a client device, an MX node makes a request to a channel manager to grant access to a streamlet for the channel from which messages are read. If the MX node has already been granted read access to a streamlet for the channel (and the channel's TTL has not been closed to reading), the MX node can read messages from the streamlet without having to request a grant to access the streamlet. The read messages can then be forwarded to client devices that have subscribed to the channel. In various implementations, messages read from streamlets are cached by MX nodes so that MX nodes can reduce the number of times needed to read from the streamlets.

By way of illustration, an MX node can request a grant from the channel manager that allows the MX node to store a block of data into a streamlet on a particular Q node that stores streamlets of the particular channel. Example streamlet grant request and grant data structures are as follows:

```
StreamletGrantRequest = {
    "channel": string( )
    "mode": "read" | "write"
    "position": 0
}
StreamletGrantResponse = {
    "streamlet-id" :"abcdef82734987",
    "limit-size": 2000000, # 2 megabytes max
    "limit-msgs": 5000, # 5 thousand messages max
    "limit-life": 4000, # the grant is valid for 4 seconds
    "q-node": string( )
    "position": 0
}
```

The StreamletGrantRequest data structure stores the name of the stream channel and a mode indicating whether the MX node intends on reading from or writing to the streamlet. The MX node sends the StreamletGrantRequest to a channel manager node. The channel manager node, in response, sends the MX node a StreamletGrantResponse data structure. The StreamletGrantResponse contains an identifier of the streamlet (streamlet-id), the maximum size of the streamlet (limit-size), the maximum number of messages that the streamlet can store (limit-msgs), the TTL (limit-life), and an identifier of a Q node (q-node) on which the streamlet resides. The StreamletGrantRequest and StreamletGrantResponse can also have a position field that points to a position in a streamlet (or a position in a channel) for reading from the streamlet.

A grant becomes invalid once the streamlet has closed. For example, a streamlet is closed to reading and writing once the streamlet's TTL has expired and a streamlet is closed to writing when the streamlet's storage is full. When a grant becomes invalid, the MX node can request a new grant from the channel manager to read from or write to a streamlet. The new grant will reference a different streamlet and will refer to the same or a different Q node depending on where the new streamlet resides.

Figure 3A:
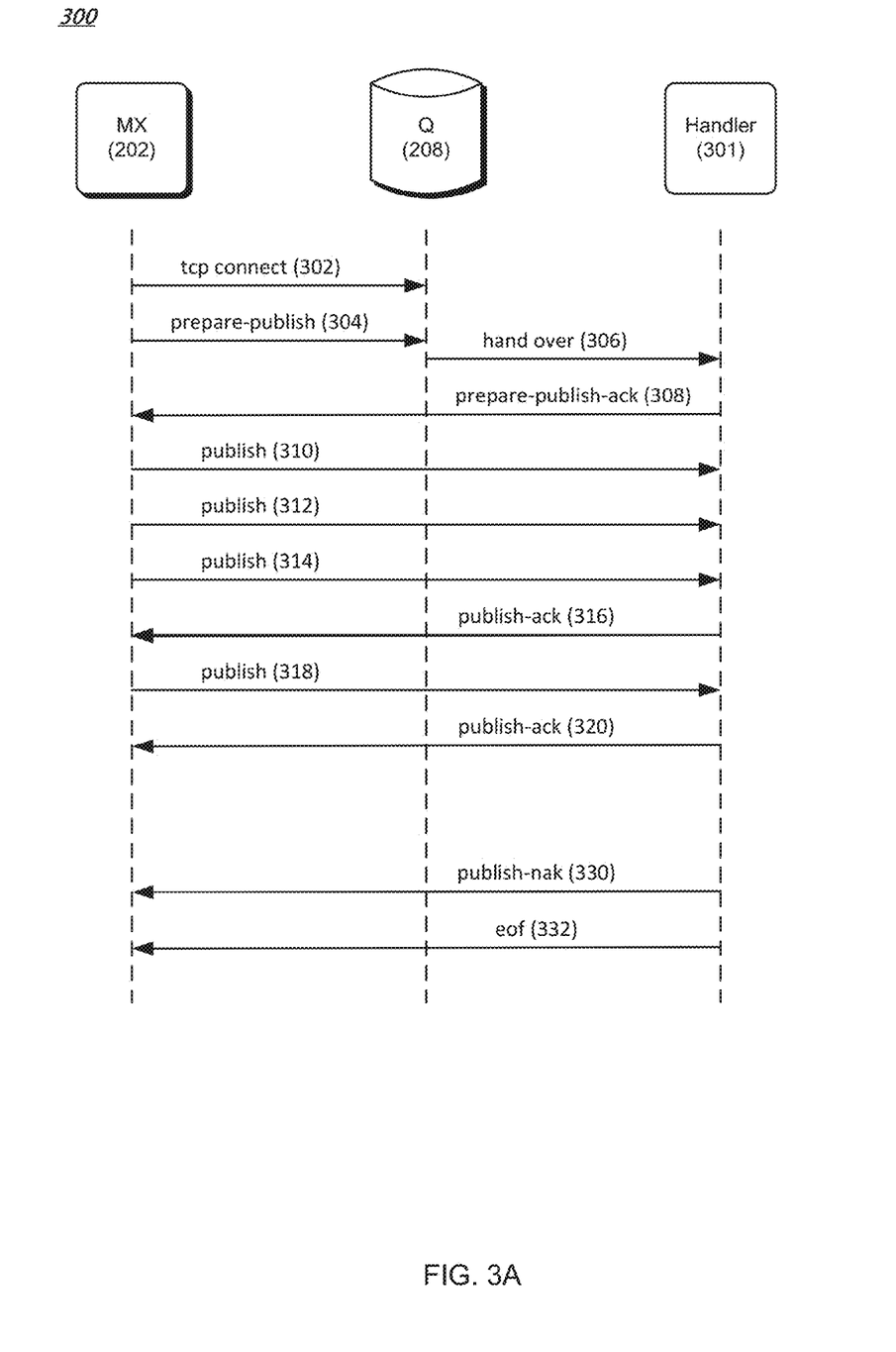
FIG. 3A is a data flow diagram of an example method for writing data to a streamlet.

FIG. 3A is a data flow diagram of an example method for writing data to a streamlet in various embodiments. In FIG. 3A, when an MX node (e.g., MX node 202) request to write to a streamlet is granted by a channel manager (e.g., channel manager 214), as described before, the MX node establishes a Transmission Control Protocol (TCP) connection with the Q node identified in the grant response received from the channel manager (302). A streamlet can be written concurrently by multiple write grants (e.g., for messages published by multiple publisher clients). Other types of connection protocols between the MX node and the Q node are possible.

The MX node then sends a prepare-publish message with an identifier of a streamlet that the MX node wants to write to the Q node (304). The streamlet identifier and Q node identifier can be provided by the channel manager in the write grant as described earlier. The Q node hands over the message to a handler process 301 (e.g., a computing process running on the Q node) for the identified streamlet (306). The handler process can send to the MX node an acknowledgement (308). After receiving the acknowledgement, the MX node starts writing (publishing) messages (e.g., 310, 312, 314, and 318) to the handler process, which in turns stores the received data in the identified streamlet. The handler process can also send acknowledgements (316, 320) to the MX node for the received data. In some implementations, acknowledgements can be piggy-backed or cumulative. For instance, the handler process can send to the MX node an acknowledgement for every predetermined amount of data received (e.g., for every 100 messages received), or for every predetermined time period (e.g., for every one millisecond). Other acknowledgement scheduling algorithms, such as Nagle's algorithm, can be used.

If the streamlet can no longer accept published data (e.g., when the streamlet is full), the handler process sends a Negative-Acknowledgement (NAK) message (330) indicating a problem, following by an EOF (end-of-file) message (332). In this way, the handler process closes the association with the MX node for the publish grant. The MX node can then request a write grant for another streamlet from a channel manager if the MX node has additional messages to store.

Figure 3B:
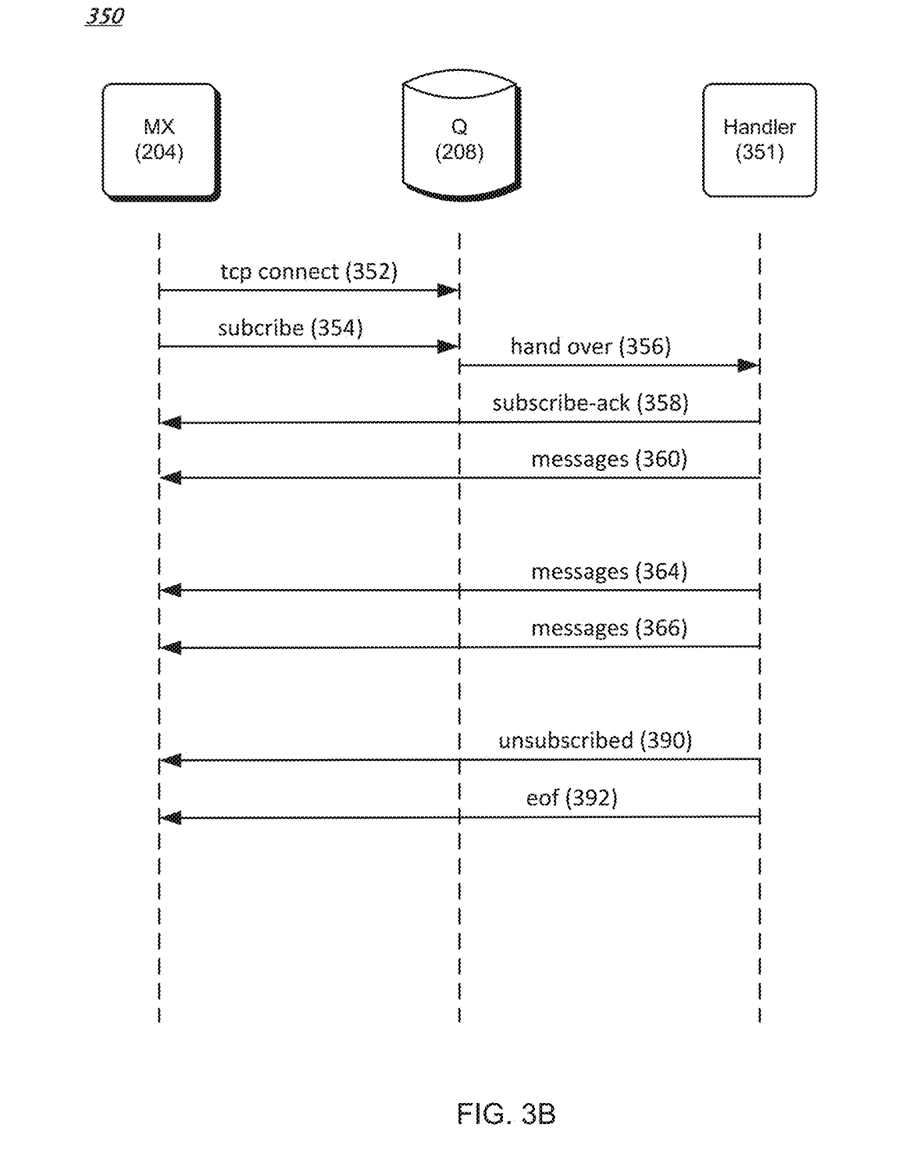
FIG. 3B is a data flow diagram of an example method for reading data from a streamlet.

FIG. 3B is a data flow diagram of an example method for reading data from a streamlet in various embodiments. In FIG. 3B, an MX node (e.g., MX node 204) sends to a channel manager (e.g., channel manager 214) a request for reading a particular channel starting from a particular message or time offset in the channel. The channel manager returns to the MX node a read grant including an identifier of a streamlet containing the particular message, a position in the streamlet corresponding to the particular message, and an identifier of a Q node (e.g., Q node 208) containing the particular streamlet. The MX node then establishes a TCP connection with the Q node (352). Other types of connection protocols between the MX node and the Q node are possible.

The MX node then sends to the Q node a subscribe message (354) with the identifier of the streamlet (in the Q node) and the position in the streamlet from which the MX node wants to read (356). The Q node hands over the subscribe message to a handler process 351 for the streamlet (356). The handler process can send to the MX node an acknowledgement (358). The handler process then sends messages (360, 364, 366), starting at the position in the streamlet, to the MX node. In some implementations, the handler process can send all of the messages in the streamlet to the MX node. After sending the last message in a particular streamlet, the handler process can send a notification of the last message to the MX node. The MX node can send to the channel manager another request for another streamlet containing a next message in the particular channel.

If the particular streamlet is closed (e.g., after its TTL has expired), the handler process can send an unsubscribe message (390), followed by an EOF message (392), to close the association with the MX node for the read grant. The MX node can close the association with the handler process when the MX node moves to another streamlet for messages in the particular channel (e.g., as instructed by the channel manager). The MX node can also close the association with the handler process if the MX node receives an unsubscribe message from a corresponding client device.

In various implementations, a streamlet can be written into and read from at the same time instance. For instance, there can be a valid read grant and a valid write grant at the same time instance. In various implementations, a streamlet can be read concurrently by multiple read grants (e.g., for channels subscribed to by multiple publisher clients). The handler process of the streamlet can order messages from concurrent write grants based on, for example, time-of-arrival, and store the messages based on the order. In this way, messages published to a channel from multiple publisher clients can be serialized and stored in a streamlet of the channel.

In the messaging system 100, one or more C nodes (e.g., C node 220) can offload data transfers from one or more Q nodes. For instance, if there are many MX nodes requesting streamlets from Q nodes for a particular channel, the streamlets can be offloaded and cached in one or more C nodes. The MX nodes (e.g., as instructed by read grants from a channel manager) can read the streamlets from the C nodes instead.

As described above, messages for a channel in the messaging system 100 are ordered in a channel stream. A channel manager (e.g., channel manager 214) splits the channel stream into fixed-sized streamlets that each reside on a respective Q node. In this way, storing a channel stream can be shared among many Q nodes; each Q node stores a portion (one or more streamlets) of the channel stream. More particularly, a streamlet can be stored in registers and dynamic memory elements associated with a computing process on a Q node, thus avoiding the need to access persistent, slower storage devices such as hard disks. This results in faster message access. The channel manager can also balance load among Q nodes in the messaging system 100 by monitoring respective workloads of the Q nodes and allocating streamlets in a way that avoids overloading any one Q node.

In various implementations, a channel manager maintains a list identifying each active streamlet, the respective Q node on which the streamlet resides, an identification of the position of the first message in the streamlet, and whether the streamlet is closed for writing. In some implementations, Q nodes notify the channel manager and any MX nodes that are publishing to a streamlet that the streamlet is closed due to being full or when the streamlet's TTL has expired. When a streamlet is closed, the streamlet remains on the channel manager's list of active streamlets until the streamlet's TTL has expired so that MX nodes can continue to retrieve messages from the streamlet.

When an MX node requests a write grant for a given channel and there is not a streamlet for the channel that can be written to, the channel manager allocates a new streamlet on one of the Q nodes and returns the identity of the streamlet and the Q node in the StreamletGrantResponse. Otherwise the channel manager returns the identity of the currently open for writing streamlet and corresponding Q node in the StreamletGrantResponse. MX nodes can publish messages to the streamlet until the streamlet is full or the streamlet's TTL has expired, after which a new streamlet can be allocated by the channel manager.

When an MX node requests a read grant for a given channel and there is not a streamlet for the channel that can be read from, the channel manager allocates a new streamlet on one of the Q nodes and returns the identity of the streamlet and the Q node in the StreamletGrantResponse. Otherwise, the channel manager returns the identity of the streamlet and Q node that contains the position from which the MX node wishes to read. The Q node can then begin sending messages to the MX node from the streamlet beginning at the specified position until there are no more messages in the streamlet to send. When a new message is published to a streamlet, MX nodes that have subscribed to that streamlet will receive the new message. If a streamlet's TTL has expired the handler process 351 sends an EOF message (392) to any MX nodes that are subscribed to the streamlet.

As described earlier in reference to FIG. 2, the messaging system 100 can include multiple channel managers (e.g., channel managers 214, 215). Multiple channel managers provide resiliency and prevent single point of failure. For instance, one channel manager can replicate lists of streamlets and current grants it maintains to another "slave" channel manager. As for another example, multiple channel managers can coordinate operations between them using distributed consensus protocols, such as Paxos or Raft protocols.

In certain implementations, a PubSub system receives messages from a plurality of publishers for one or more channels. The PubSub system components (e.g., Q nodes or MX nodes) may order the messages and write the messages to one or more buffers (e.g., one buffer per channel). Various system components and/or processes may read the messages from the buffers and distribute the messages to one or more recipients or subscribers.

Figure 4A:
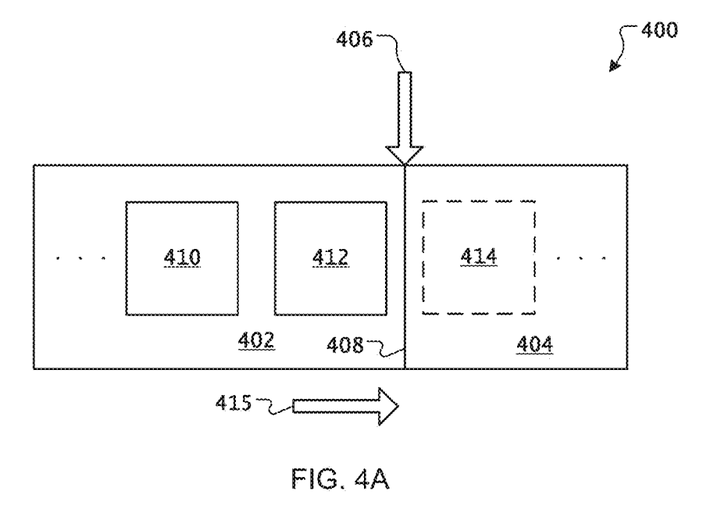
FIG. 4A is a schematic diagram of an example buffer at a first time.
Figure 4B:
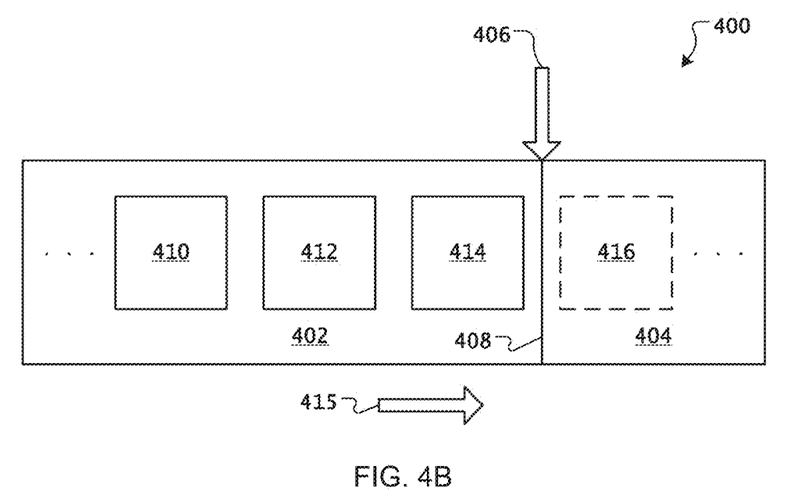
FIG. 4B is a schematic diagram of the example buffer of FIG. 4A at a second time.

FIGS. 4A and 4B are schematic diagrams of an example buffer 400 or zero-copy queue for storing message data in a PubSub system. The buffer 400 includes a readable portion 402 and a writable portion 404. One or more components or processes of the PubSub system (e.g., a Q node or an MX node) may write messages to the writable portion 404 and/or may read messages from the readable portion 402. A pointer 406 demarks a boundary 408 between the readable portion 402 and the writable portion 404. The pointer 406 may be or include, for example, a memory address.

FIG. 4A shows the example buffer 400 at a first time when messages 410 and 412 are stored in the readable portion 402 and a new message 414 is being written to the writable portion 404. The pointer 406 indicates the boundary 408 between the readable portion 402 and the writable portion 404 is between message 412 and message 414. At this first time, one or more PubSub system components or processes (e.g., a Q node or an MX node) can read messages 410 and 412 from the readable portion 402. A PubSub system component or process can also write the new message 414 to the writable portion 404. In various examples, PubSub system components and/or processes can read from and write to the buffer 400 in parallel, such that reading and writing occur simultaneously. For example, multiple components and/or processes may read message 410 and/or message 412 from the readable portion 402 at the same time. Also, while message 410 and/or message 412 are being read, a component or process may write new message 414 to the writable portion 404. An arrow 415 indicates a direction of flow for message data through the buffer 400. As the arrow 415 indicates, new messages are added to a right-hand side of the buffer, such that older messages are on a left-hand side and newer messages are on the right-hand side.

FIG. 4B shows the example buffer 400 at a second time when message 414 has been successfully written to the buffer 400 and the pointer 406 has been advanced to indicate message 414 now resides within the readable portion 402. At this second time, messages 410, 412, and 414 are available to be read from the readable portion 402, and a new message 416 is being written to the writable portion 404. Once message 416 has been written to the buffer 400, an additional atomic operation may be performed to further advance the pointer 406 and the boundary 408, such that message 416 resides in the readable portion 402. An additional message may then be written to the writable portion 404.

In preferred implementations, new messages are written to the writable portion 404 and moved to the readable portion 402 before any additional new message is added to the writable portion 404. This prevents a new message from being overwritten by another new message. Once a new message is successfully written to the buffer 400, the pointer 406 may be advanced to a new position, according to a length of the new message. The new position of the pointer 406 may be, for example, a previous position of the pointer 406 plus the length of the new message. Pointer positions and message lengths may be stored in memory.

In preferred implementations, the pointer 406 is advanced to a new position in an atomic operation, during which certain reading or writing activity associated with the buffer 400 is prohibited. For example, during the atomic operation, PubSub system components or processes may be unable to write to the buffer 400 and/or to read a message that was most recently added to the buffer 400. Alternatively or additionally, PubSub system components may be unable to read the pointer 406 during the atomic operation. This may prevent PubSub system components or processes from reading erroneous pointer locations while the pointer 406 is being advanced, which can take more than one CPU cycle. In general, a message that is newly added to the buffer 400 is not part of the readable portion 402 or available for reading until the pointer 406 has been advanced in the atomic operation and the new message resides in the readable portion 402. All other messages in the readable portion 402 may be available for reading before, during, and/or after the atomic operation. In certain examples, the atomic operation is an atomic add or a fetch-and-add operation. The atomic operation preferably cannot be interrupted by another process or thread of execution. In various implementations, messages are ordered and written to the writable portion 404 one at a time (i.e., serially). Ordering the messages may include, for example, arranging or prioritizing the messages according to a time of receipt (e.g., an order in which the messages were received by the PubSub system). Writing the messages one at a time prevents a new message from being overwritten by another new message. Before any new message can be written to the writable portion 404, the previous new message should be written completely and moved to the readable portion 402, by advancing the pointer 406.

In certain examples, the buffer 400 is implemented by allocating a portion of memory on a globally accessible storage device. A portion of the globally accessible storage device may store information for the pointer (e.g., a memory address). The buffer 400 may be assigned a time-to-live, after which the buffer expires and is no longer accessible for writing and reading.

In general, the buffer 400 forms part of or is used by a component of the PubSub system. For example, the buffer 400 may form part of or be used by a Q node or an MX node of the Pub Sub system. Each MX node and each Q node in the PubSub system may have or use its own set of buffers for storing message data. Each set of buffers may include one buffer per channel, or more than one buffer per channel. In some instances, a single buffer may be used to store message data for all channels, for a PubSub system component.

Each MX node, Q node, or other PubSub system component that uses or includes the buffers preferably makes only one copy of any given message received by the component. This minimizes the amount of writing that must be performed by the MX nodes and Q nodes, and also frees up CPU time for other processes. To share a message with subscribers, components, or processes that request the message, a location (e.g., a memory address) of the message in the buffer 400 may be provided to the subscriber or process, which may then read the message from the location in the buffer 400.

When a component or process wants to write a message to the buffer 400, a message may be sent to a writing process (e.g., an ERLANG writing process) for the buffer 400. The writing process may then write the message and other messages to the buffer 400 in the order in which the messages are received (e.g., based on a time of receipt of the message or notification by the writing process). For each message written to the buffer 400, the writing process may first write the message into the writable portion 404 of the buffer (e.g., at a tail end of the buffer 400 indicated by a current position of the pointer 406). The writing process may then move the pointer 406 to a position after the newly written message, using the atomic operation (e.g., a fetch-and-add atomic operation). In some instances, a length of each message is written to the buffer 400 along with the message itself (e.g., in front of the message), so that readers know how large the message is (e.g., in bytes).

Figure 5:
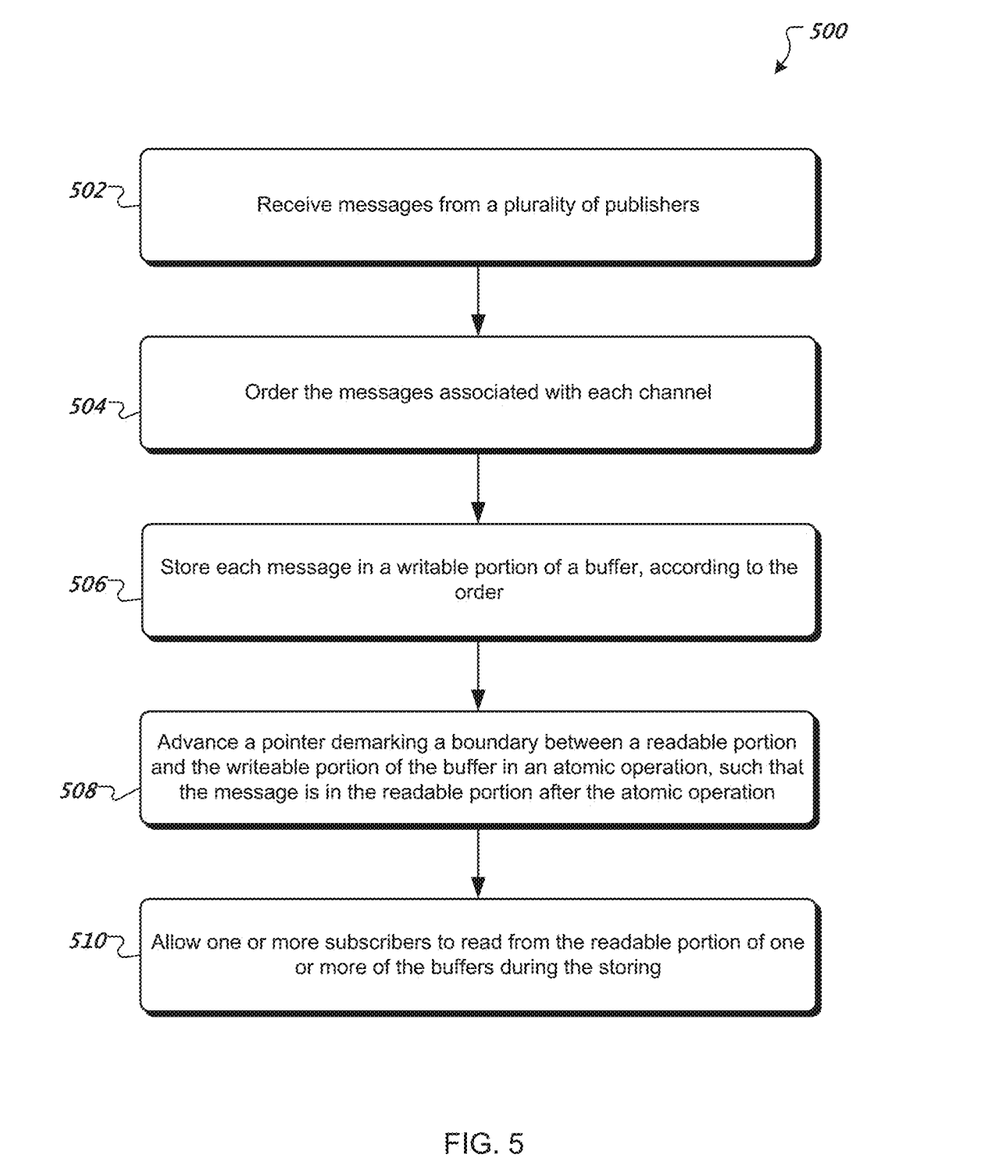
FIG. 5 is an example method of storing messages in a buffer.

FIG. 5 is a flowchart of an example method 500 of storing message data for a plurality of channels in a PubSub system. The PubSub system receives (step 502) a plurality of messages from a plurality of publishers. The publishers may be, for example, client devices of users, MX nodes, or Q nodes. Each of the messages is preferably associated with one of a plurality of distinct channels. The messages are ordered (step 504) for each channel, for example, according to an order in which the messages were received from the publishers. Each message of each of the channels is stored (step 506) in a respective buffer for the channel. To store the message for a channel, the message is written to a writable portion of the respective buffer, according to the order of the messages assigned to the channel. A pointer demarking a boundary between a readable portion and the writeable portion of the buffer is advanced (step 508) in an atomic operation. After advancing the pointer, the message resides in the readable portion of the buffer. One or more subscribers are allowed (step 510) to read from the readable portion of one or more of the buffers.

In various implementations, the systems and methods described herein utilize an automatic back-pressure mechanism that reduces pressure on the system during periods of high message traffic. In general, back-pressure is a way to put load shedding on edges of the system. The back-pressure may prevent the system from crashing or exploding when system resources are incapable of handling a large number of write requests. For example, because the zero-copy queue (e.g., buffer 400) has limited size, at some point the zero-copy queue reaches its storage capacity. When the zero-copy queue is full, no system components are able to write to the zero-copy queue, due at least in part to atomic operations. In that case, a writer (e.g., an MX node or a Q node) that attempts a write operation will receive an error message informing the writer that the zero-copy queue is full. The writer may then reattempt the write operation by asking an external entity (e.g., an arbiter) to identify the next zero-copy queue that is available for writing. Old zero-copy queue buffers are preferably recycled after a certain time-to-live, which may be 10 seconds, 30 seconds, 60 seconds, or more.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative, procedural, or functional languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a smart phone, a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
   receiving a plurality of messages from a plurality of publishers, wherein each of the messages is associated with one of a plurality of channels; and
   storing each message of each of the channels in a respective buffer for the channel according to an order of the messages assigned to the channel, wherein storing comprises:
      storing the message in a writable portion of the buffer; and
      advancing a pointer demarking a boundary between a readable portion of the buffer and the writeable portion of the buffer in an atomic operation such that the message is in the readable portion of the buffer after the atomic operation has completed,
      wherein messages in the writable portion of the buffer are inaccessible to subscribers.

2. The method of claim 1, comprising: allowing one or more subscribers to read from the readable portion of one or more of the buffers during the storing.

3. The method of claim 1, wherein the atomic operation cannot be interrupted by another process or thread of execution.

4. The method of claim 1, wherein storing the message in the writable portion of the buffer comprises:
   storing a length of the message at a first location in the writable portion of the buffer; and
   storing the message in the writable portion of the buffer following the first location.

5. The method of claim 1, wherein advancing the pointer demarking the boundary between the readable portion of the buffer and the writable portion of the buffer in an atomic operation comprises:
   storing a sum of the length of the message and a current value of the pointer in the pointer.

6. The method of claim 1, wherein each buffer stores messages for a single channel.

7. The method of claim 1, wherein each buffer for a particular channel expires at a different time based on a time-to-live for the buffer.

8. The method of claim 1, wherein each buffer comprises a respective time-to-live upon expiration of which will cause the buffer to be inaccessible to publishers and subscribers.

9. The method of claim 1, wherein the messages are ordered according to respective receipt times of the messages.

10. A system, comprising:
    one or more computer processors programmed to perform operations comprising:
       receiving a plurality of messages from a plurality of publishers, wherein each of the messages is associated with one of a plurality of channels; and
       storing each message of each of the channels in a respective buffer for the channel according to an order of the messages assigned to the channel, wherein storing comprises:
          storing the message in a writable portion of the buffer; and
          advancing a pointer demarking a boundary between a readable portion of the buffer and the writeable portion of the buffer in an atomic operation such that the message is in the readable portion of the buffer after the atomic operation has completed,
          wherein messages in the writable portion of the buffer are inaccessible to subscribers.

11. The system of claim 10, comprising:
    allowing one or more subscribers to read from the readable portion of one or more of the buffers during the storing.

12. The system of claim 10, wherein the atomic operation cannot be interrupted by another process or thread of execution.

13. The system of claim 10, wherein storing the message in the writable portion of the buffer comprises:
    storing a length of the message at a first location in the writable portion of the buffer; and
    storing the message in the writable portion of the buffer following the first location.

14. The system of claim 10, wherein advancing the pointer demarking the boundary between the readable portion of the buffer and the writable portion of the buffer in an atomic operation comprises:
    storing a sum of the length of the message and a current value of the pointer in the pointer.

15. The system of claim 10, wherein each buffer stores messages for a single channel.

16. The system of claim 10, wherein each buffer for a particular channel expires at a different time based on a time-to-live for the buffer.

17. The system of claim 10, wherein each buffer comprises a respective time-to-live upon expiration of which will cause the buffer to be inaccessible to publishers and subscribers.

18. The system of claim 10, wherein the messages are ordered according to respective receipt times of the messages.

19. The system of claim 10, wherein a particular buffer corresponds to a writing process on one of the computer processors.

20. An article, comprising:
 a non-transitory computer-readable medium having instructions stored thereon that, when executed by one or more computers, cause the computers to perform operations comprising:
 receiving a plurality of messages from a plurality of publishers, wherein each of the messages is associated with one of a plurality of channels; and
 storing each message of each of the channels in a respective buffer for the channel according to an order of the messages assigned to the channel, wherein storing comprises:
  storing the message in a writable portion of the buffer; and
  advancing a pointer demarking a boundary between a readable portion of the buffer and the writeable portion of the buffer in an atomic operation such that the message is in the readable portion of the buffer after the atomic operation has completed,
  wherein messages in the writable portion of the buffer are inaccessible to subscribers.

* * * * *